(12) United States Patent
Chen et al.

(10) Patent No.: US 7,706,145 B2
(45) Date of Patent: Apr. 27, 2010

(54) ASSEMBLY DEVICE FOR A COMPUTER CASE AND OUTER COVER

(75) Inventors: Richard Chen, San Jose, CA (US); Albert Hua, Palo Alto, CA (US)

(73) Assignee: Super Micro Computer, Inc., San Jose, CA (US)

( * ) Notice: Subject to any disclaimer, the term of this patent is extended or adjusted under 35 U.S.C. 154(b) by 0 days.

(21) Appl. No.: 11/400,183

(22) Filed: Apr. 10, 2006

(65) Prior Publication Data

US 2007/0236876 A1    Oct. 11, 2007

(51) Int. Cl.
*H05K 5/00* (2006.01)
(52) U.S. Cl. .................... 361/730; 361/679
(58) Field of Classification Search ............ 361/679, 361/600, 683, 704, 715, 732, 728–730, 687, 361/707, 724
See application file for complete search history.

(56) References Cited

U.S. PATENT DOCUMENTS

| | | | | |
|---|---|---|---|---|
| 5,838,402 A * | 11/1998 | Sanpei et al. | ................. | 349/60 |
| 5,934,775 A * | 8/1999 | Ho | ........................... | 312/223.2 |
| 6,653,802 B1 * | 11/2003 | Nelson et al. | ............... | 315/291 |
| 6,671,175 B1 * | 12/2003 | Chen | .......................... | 361/715 |

* cited by examiner

*Primary Examiner*—Hung S Bui
(74) *Attorney, Agent, or Firm*—Jackson IPG PLLC (57) ABSTRACT

An assembly device for a computer case and outer cover incorporating: a host case provided with a bottom plate and perpendicular left and right side walls, a circuit motherboard fixed within the holding space, a jack panel of relatively small area and size is located at a tail end of the circuit motherboard, and an electrical circuit is printed on an inverse side of the jack panel; a rectangular outer cover, the outer cover can be assembled/disassembled to/from the rectangular gap of the host case, and the jack panel can be plugged into or withdrawn from the socket, thereby realizing a rapid and convenient method of assembling and disassembling the outer cover to and from the host case.

7 Claims, 9 Drawing Sheets

ASSEMBLY DEVICE FOR A COMPUTER CASE AND OUTER COVER

BACKGROUND OF THE INVENTION (a) Field of the Invention

The present invention relates to an assembly device for a computer case and outer cover, and more particularly to an outer cover that effects an electrical connection when assembled on a host case, and when the outer cover is separated from the host case, the electrical connection is disconnected, thereby eliminating the practice and fault of having to assemble or disassemble two connection ports of a prior art flexible flat cable to or from a circuit daughter board of the outer cover and a circuit motherboard within the host case.

(b) Description of the Prior Art

A circuit daughter board embedded within a holding space of an outer cover and a circuit motherboard interior of a host case or server case of prior art are both electrically connected by means of a flexible flat cable, whereby two connection ports of two ends of the flexible flat cable respectively connect to a connection port of the circuit daughter board and a connection port of the circuit motherboard, thereby enabling signals processed by the circuit motherboard to be transmitted to the circuit daughter board for use thereby using the flexible flat cable. Taiwan new model patent M254055 discloses a classical structure of a flexible flat cable, wherein, when connecting ports at two ends of the flexible flat cable are respectively connected to a daughter and mother circuit boards, and more particularly when an outer cover is assembled to a host case, there is the likelihood that the flexible flat cable becomes twisted or overlaps within the interior holding space of the host case. Moreover, the relatively high temperature of the holding space easily causes hardening and degeneration of the flat cable after being disposed for a long period of time under such relatively high temperature conditions, which results in a short circuit or broken circuit, and the further possible loss of effectiveness of a display unit on a surface of the outer cover or a control switch. The flexible flat cable also occupies internal space of the host case, and, moreover, makes contact and attaches to electronic components on circuit boards, thereby producing an increase in temperature at contact surfaces, which easily damages the electronic components (such as chips, memory or CPU).

When disassembling the outer cover from the host case, a user must further disassemble the connecting ports at the two ends of the flexible flat cable from the circuit motherboard and the circuit daughter board. Moreover, prior to assembling the outer cover to the host case, the user must first respectively connect the two end connecting ports of the flexible flat cable to the circuit motherboard and the circuit daughter board. Hence, such a configuration increases operational man-hours when assembling or disassembling the outer cover to or from the host case, and affects conductive reliability of the electrical connection of the connecting ports connected to the circuit motherboard and the circuit daughter board. Moreover, infirm connection of connecting terminals or poor contact with the connecting terminals produces poor signal transmission or loss in effectiveness.

Hence, subject of the present invention is to resolve and surmount existent technical difficulties to invent an assembly device that eliminates the need for a flexible flat cable when assembling an outer cover to a host computer case.

SUMMARY OF THE INVENTION

A primary objective of the present invention is to provide an assembly device for a computer case and outer cover that uses a connection socket soldered to a reverse side of a daughter board fixed interior of an outer cover, and a jack panel located at a rear end of a circuit motherboard fixed interior of a host case, so that when the outer cover is being assembled to or disassembled from the host case, the jack panel is able to be directly plugged into or withdrawn from the connection socket, thereby realizing a rapid and convenient method of assembling and disassembling the outer cover to and from the host case.

Another objective of the present invention is to provide the assembly device for a computer case and outer cover that uses an electrical connection between a circuit motherboard and a circuit daughter board, thereby eliminating connection of a flexible flat cable of prior art, and improving reliability of signal transmission between the circuit motherboard and the circuit daughter board.

Yet another objective of the present invention is to provide the assembly device for a computer case and outer cover, wherein, because assembly space between the outer cover and the host case excludes a "flexible flat cable", thus, the space is able to provide additional ventilation and a temperature lowering effect.

And yet another objective of the present invention is to provide the assembly device for a computer case and outer cover that realizes a firm assembly of the outer cover on the host case.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
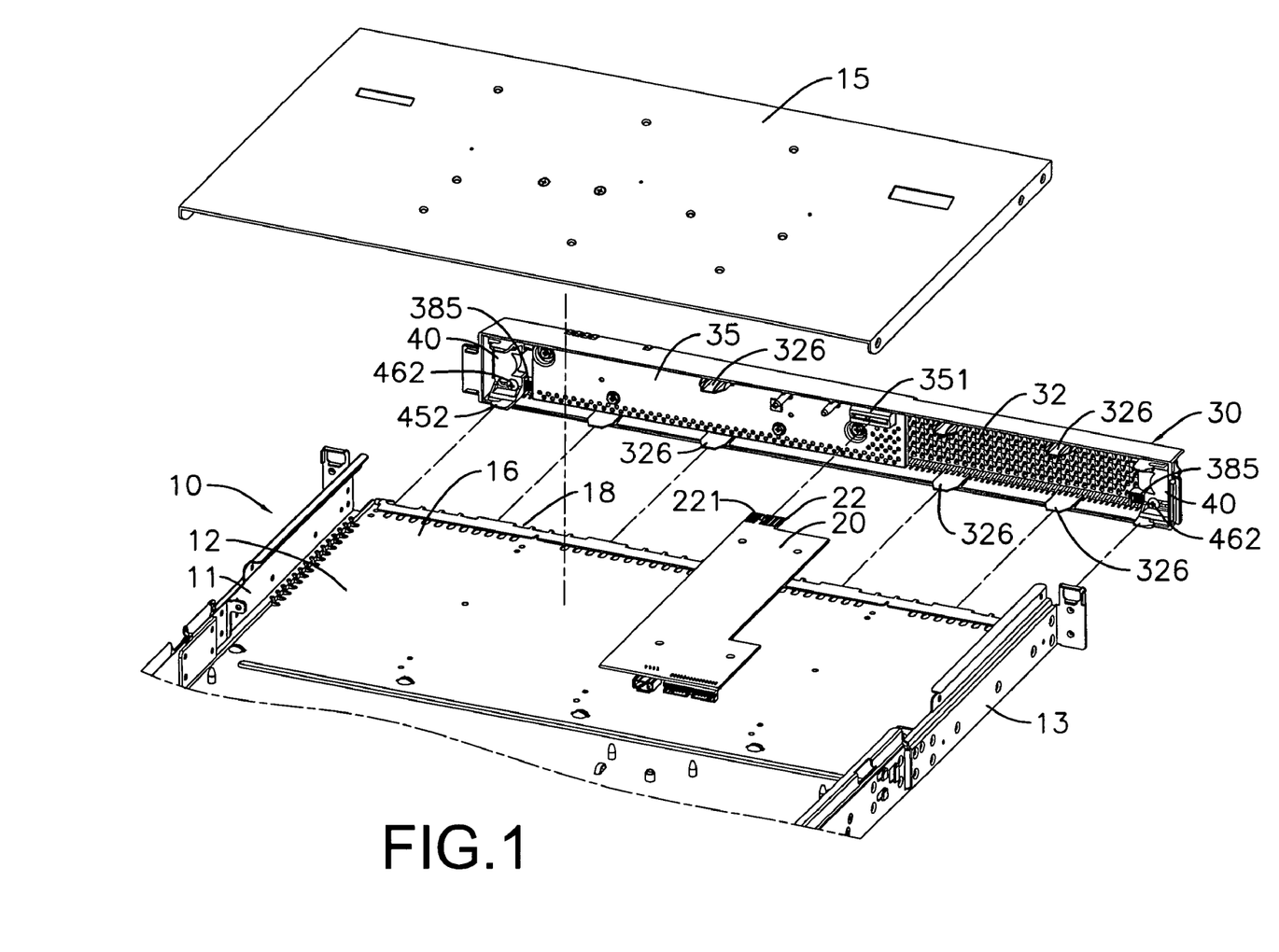
FIG. 1 shows an exploded elevational view of component members according to the present invention.
Figure 3:
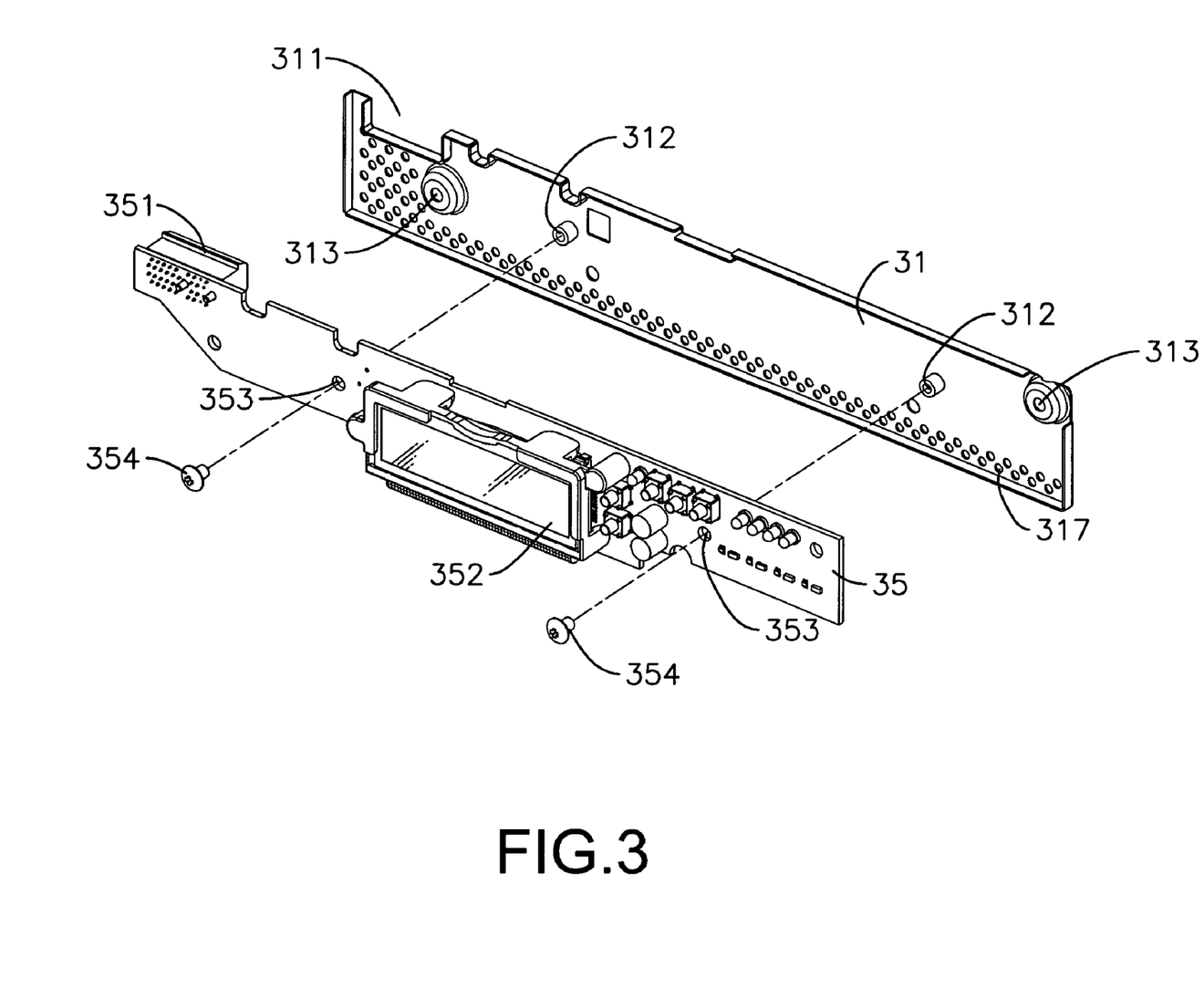
FIG. 3 shows an exploded elevational view of a circuit daughter board fixed to a fixing piece according to the present invention.

Referring to FIG. 1, which shows the assembly device for a computer case and outer cover of the present invention, comprising:

a host case 10 provided with a bottom plate 12 and perpendicular left and right side walls 11, 13, which enable an upper cover 15 to embed join thereon; a holding space 16 is formed between the bottom plate 12 and the upper cover 15, and a rectangular gap 18 is formed in an opening of the holding space 16;

a circuit motherboard 20 fixed within the holding space 16, a jack panel 22 of relatively small area and size is located at a tail end of the circuit motherboard 20, and an electrical circuit is printed on an inverse side of the jack panel 22;

a rectangular outer cover 30, interior of which is provided with a holding space 32 that enables affixing the following component members therein:

(a) a rectangular laminate fixing piece 31 defined with a gap 311 (see FIG. 3);

(b) a circuit daughter board 35 having a rectangular laminate form, a surface of which has a socket 351 soldered thereon that provides for an electric plug to be inserted therein, a display unit 352 is soldered to another surface of the circuit daughter board 35, and the circuit daughter board 35 is fixedly connected to an inner surface of the fixing piece 31 so that the socket 351 is positioned within the gap 311.

The outer cover 30 can be assembled into and disassembled from the rectangular gaps 18 of the host case 10, and the jack panel 22 can be plugged into/withdrawn from the socket 351.

Figure 2:
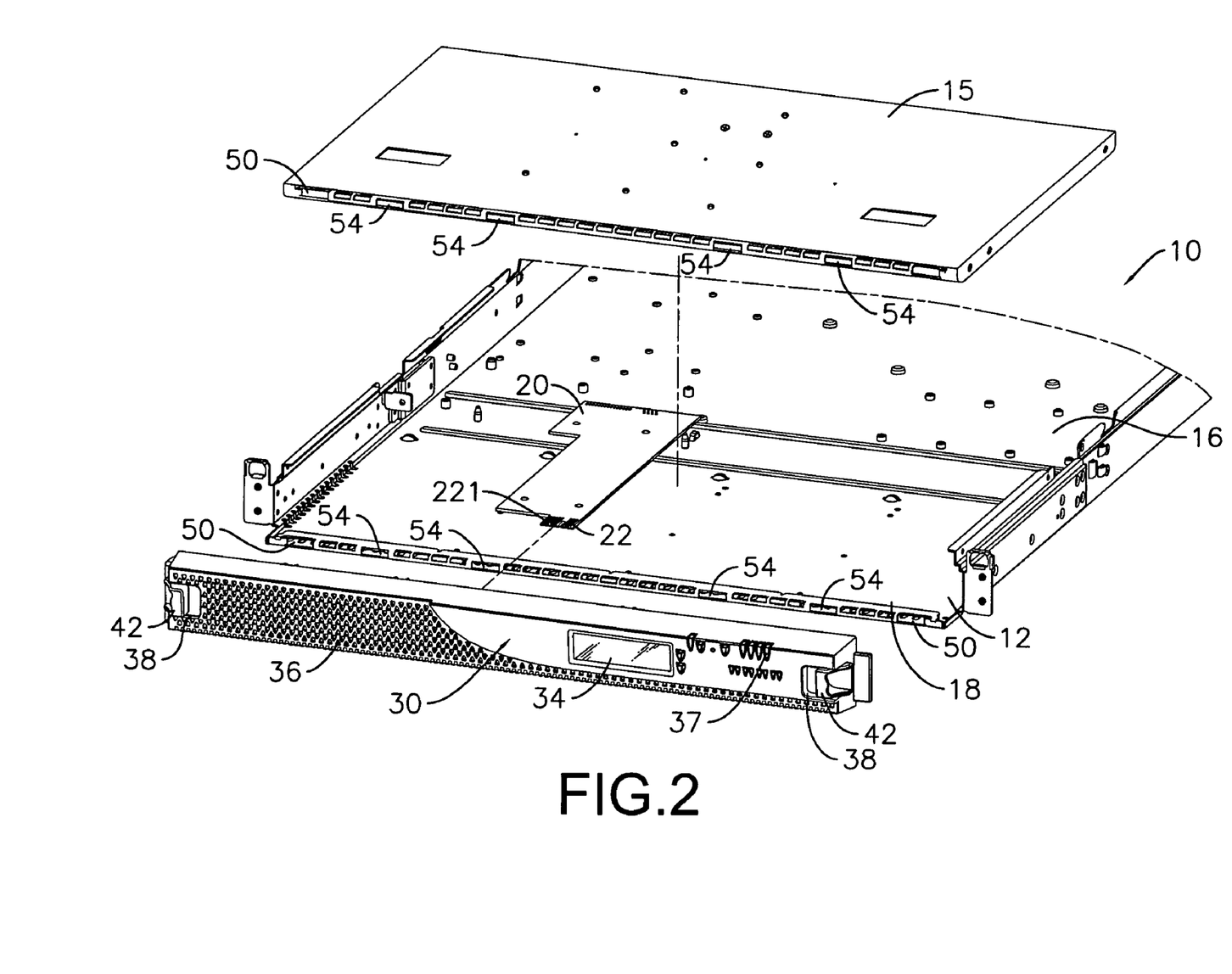
FIG. 2 shows another exploded elevational view of the component members according to the present invention.

Referring to FIGS. 2 and 3, wherein a window 34 structured with a transparent cover is formed on an outer surface of the outer cover 30, and the display unit 352 is positioned so as to correspond to an inner surface of the window 34.

A plurality of ventilation holes 36 and push-buttons 37 that can be pressed by a user are located on an outer surface of the outer cover 30.

Figure 9:
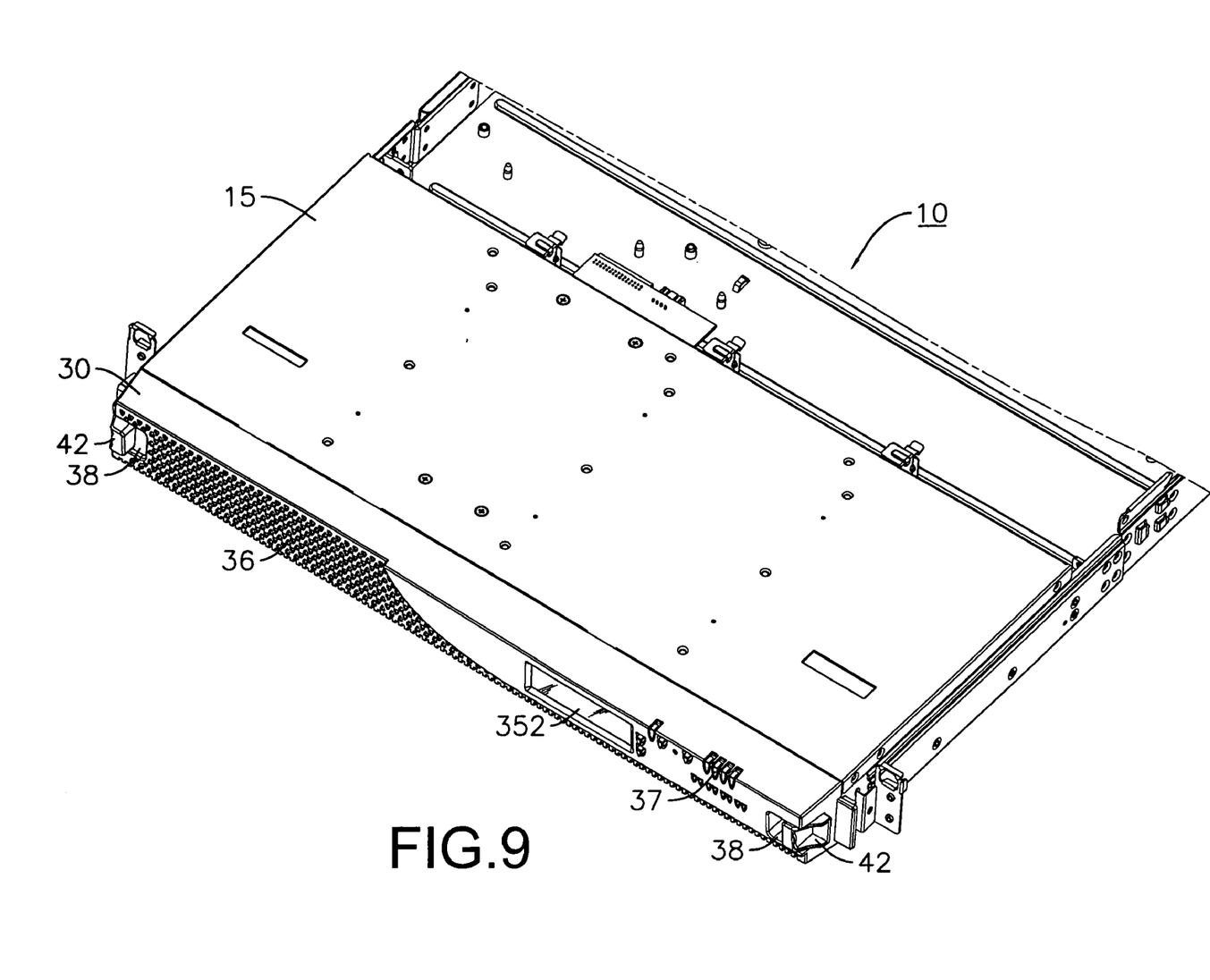
FIG. 9 shows an assembled elevational view of the present invention.

Wherein, a depressed space 38 is formed on each of two sides of the outer cover 30 (see FIG. 9).

Referring to FIGS. 5, 6, 7 and 8, wherein an upper portion of each of two slide blocks 40, (40) is provided with a displacement piece 42 that the user can move with his hand, and a lower portion of the displacement piece 42 is provided with a slide base 44. The displacement piece 42 and the slide base 44 are formed as an integrated body, a bottom portion of which is provided with a slide groove 45, and a hook member 452 is formed on a lower portion of the slide groove 45. Rectangular recesses 321 are respectively defined on two sides of the holding space 32 of the outer cover 30, and one side of each of the recesses 321 forms a protruding wall 324. A fixed inner bolt post 322 is located within each of the recesses 321, and the inner bolt posts 322 are respectively provided with bolt holes 323. Rectangular holding spaces 441 are defined in a side bottom portion of each of the slide bases 44 (see FIG. 6), and narrow through grooves 444 are respectively defined in adjacent walls of the rectangular holding spaces 441. A rectangular through hole 443 is defined in one surface of each of the slide bases 44 (see FIG. 5), and the protruding walls 324 slide connect into the narrow through grooves 444, thereby enabling the protruding walls 324 to serve as tracks. The inner bolt posts 322 movably penetrate the holding spaces 441, and bolts 462, (462) respectively penetrate the rectangular through holes 443, (443) and bolt down into the inner bolt posts 322. A resilient member 385 is respectively disposed within each of the recesses 321, and an end of each of the elastic members 385 abuts against a wall surface of the respective recesses 321, while another end of each of the resilient members 385 abuts against a side wall surface of the respective slide base 44.

Figure 5:
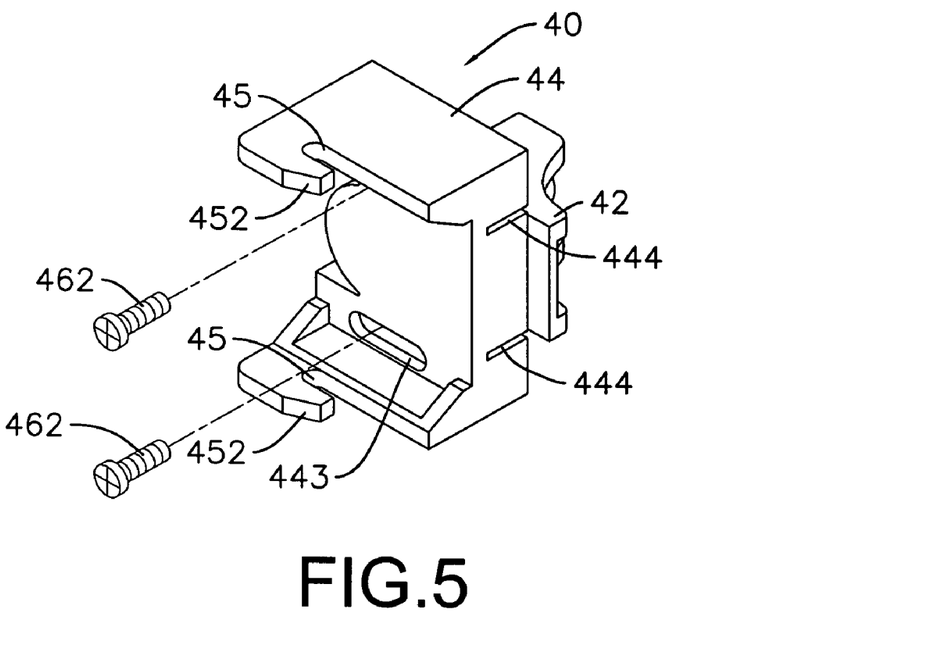
FIG. 5 shows an elevational view of a slide block according to the present invention.
Figure 6:
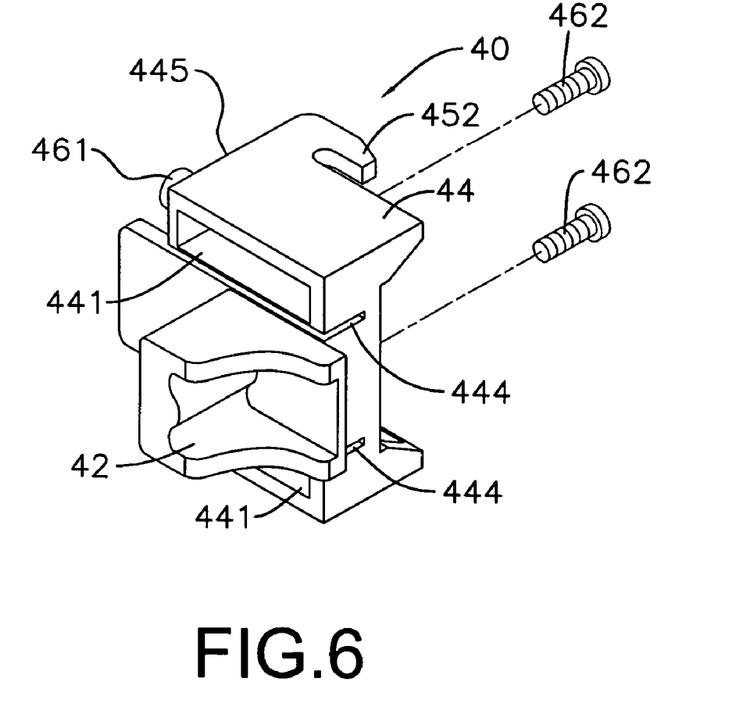
FIG. 6 shows another elevational view of the slide block according to the present invention.

The slide blocks 40 are respectively movably connected to the protruding walls 324 and the inner bolt posts 322, which enable the slide blocks 40 to linear displace on the respective protruding walls 324.

Figure 7:
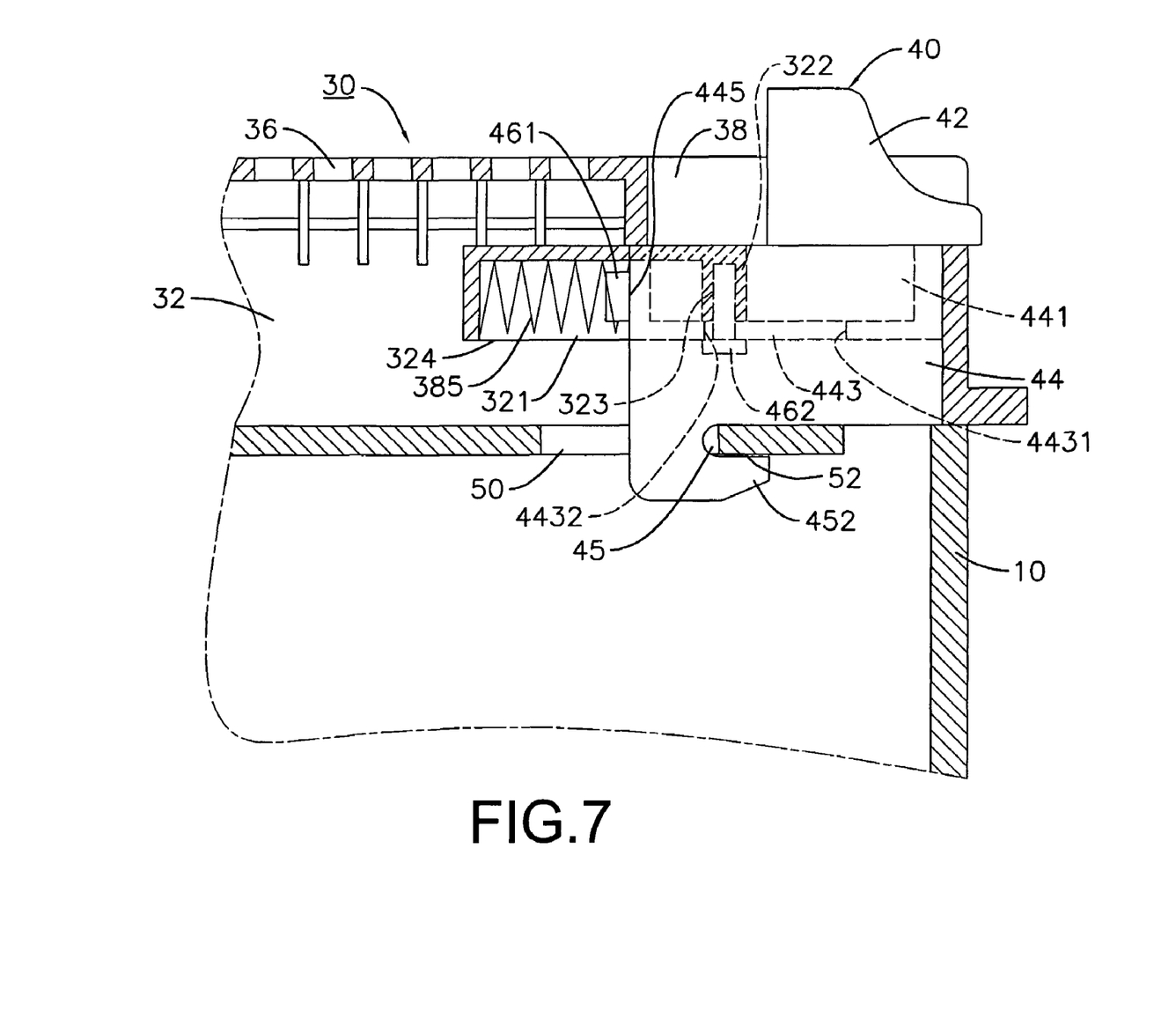
FIG. 7 shows a partial cross-sectional view of a hook member of the slide block hooked onto a host case according to the present invention.
Figure 8:
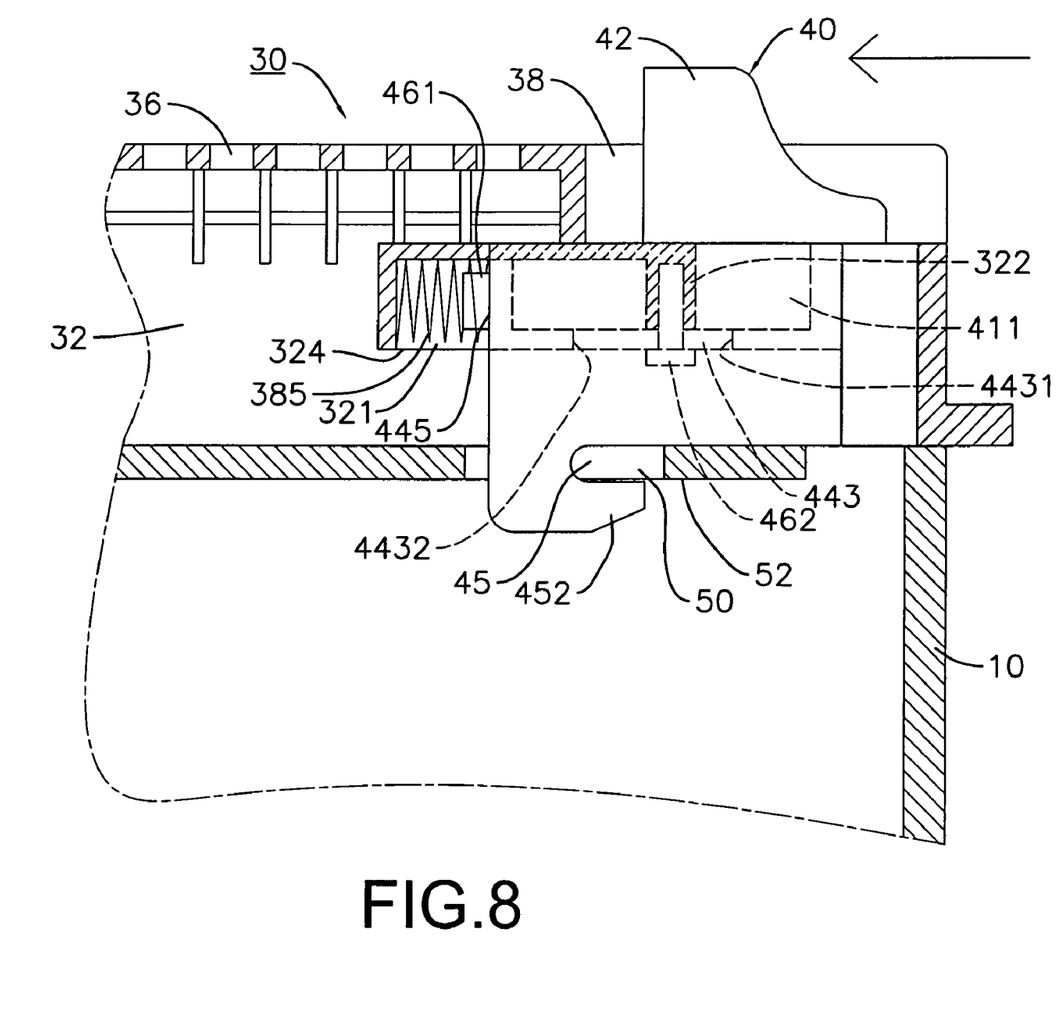
FIG. 8 shows a partial cross-sectional view of the hook member of the slide block positioned within a position fixing hole of the host case according to the present invention.

First position fixing holes 50, (50) are respectively defined in two sides of outer ends of the upper cover 15 and the bottom plate 12. The hook members 452 penetrate and connect within the first position fixing holes 50, (50) by respectively hooking onto hole walls 52, (52) of the first position fixing holes 50, (50).

Referring to FIG. 3, wherein connecting holes 353 are defined in the circuit daughter board 35, and bolt holes 312 are defined in a surface of the fixing piece 31. Bolts 354 respectively penetrate the connecting holes 353 and bolt within the bolt holes 312, thereby fixing the circuit daughter board 35 to the fixing piece 31.

Figure 4:
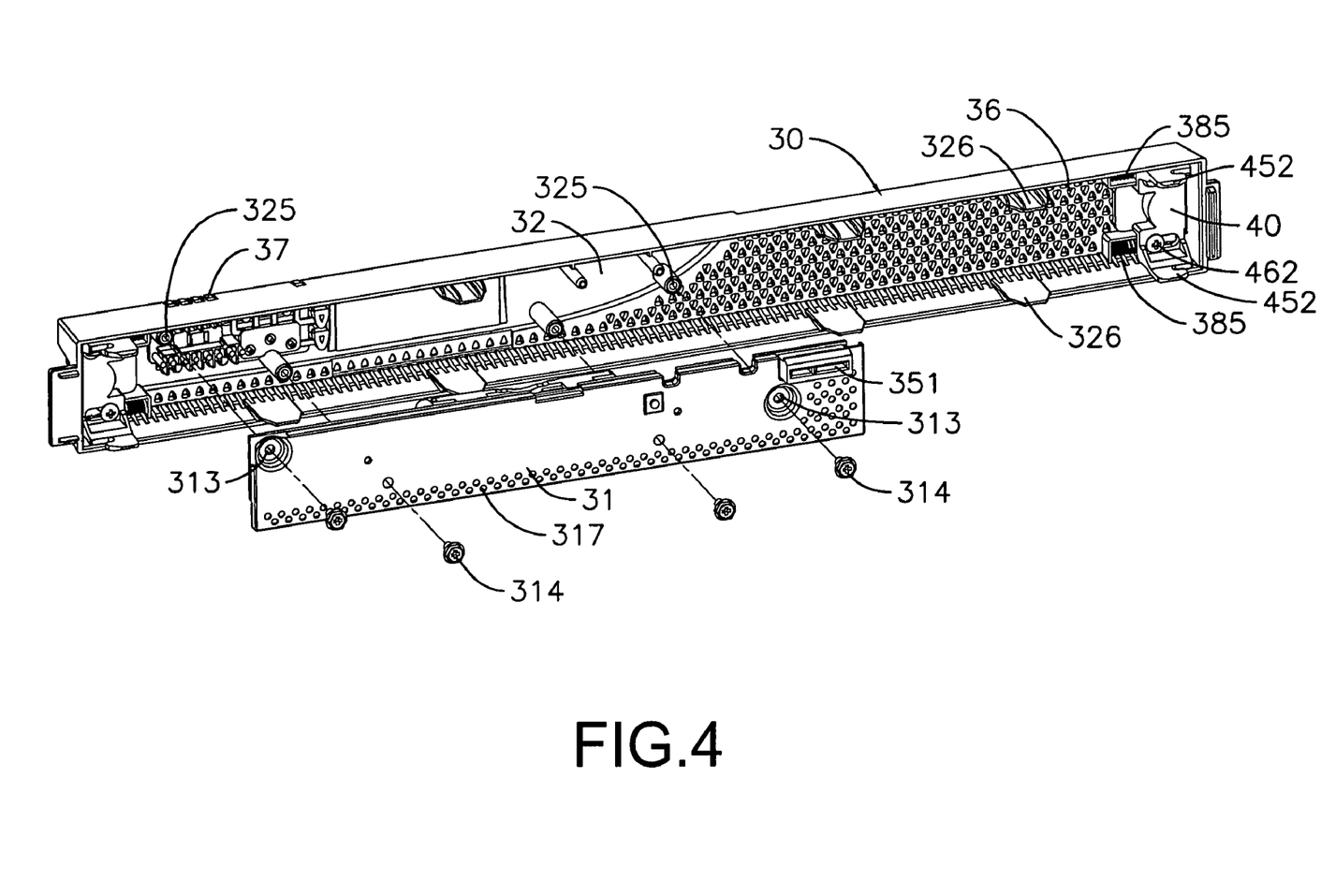
FIG. 4 shows an exploded elevational view of the circuit daughter board and the fixing piece fixed within a holding space of an outer cover according to the present invention.

Referring to FIG. 4, wherein connecting holes 313 are defined in the surface of the fixing piece 31, and bolt holes 325 are defined in the holding space 32 of the outer cover 30. Bolts 314 respectively penetrate the connecting holes 313 and bolt within the bolt holes 325, thereby fixedly positioning the fixing piece 31 within the holding space 32.

Referring to FIG. 2, wherein a plurality of second position fixing holes 54, (54) are respectively defined in the two sides of the outer ends of the upper cover 15 and the bottom plate 12 of the host case 10.

A plurality of resilient pieces 326 respectively extend and protrude from upper and lower wall edges of the holding space 32 of the outer cover 30 (see FIG. 1), which are used to clasp within the second connecting holes 54, (54).

Referring to FIG. 8, which shows implementation of disassembling an outer cover 30 from a host case 10, wherein a user moves displacement pieces 42 of movably connected slide blocks 40 in two side depressed spaces 38 of the outer cover 30 with his fingers, thereby causing the slide blocks 40 to synchronously displace horizontally, and side walls 445 of slide bases 44 push against resilient members 385, thereby causing a contracted state in the resilient members 385. After the resilient members 385 have contracted and deformed within recesses 321, heads of bolts 462 press tight on surfaces of hole edges of rectangular through holes 443, at which time the displacement pieces 42 together with the slide bases 44 have synchronously displaced, whereupon the bolts 462 are secured within the inner bolt posts 322, thereby fixing the inner bolt posts 322 within the recesses 321, and the bolts 462 assume fixed vertical posts.

Figure 10:
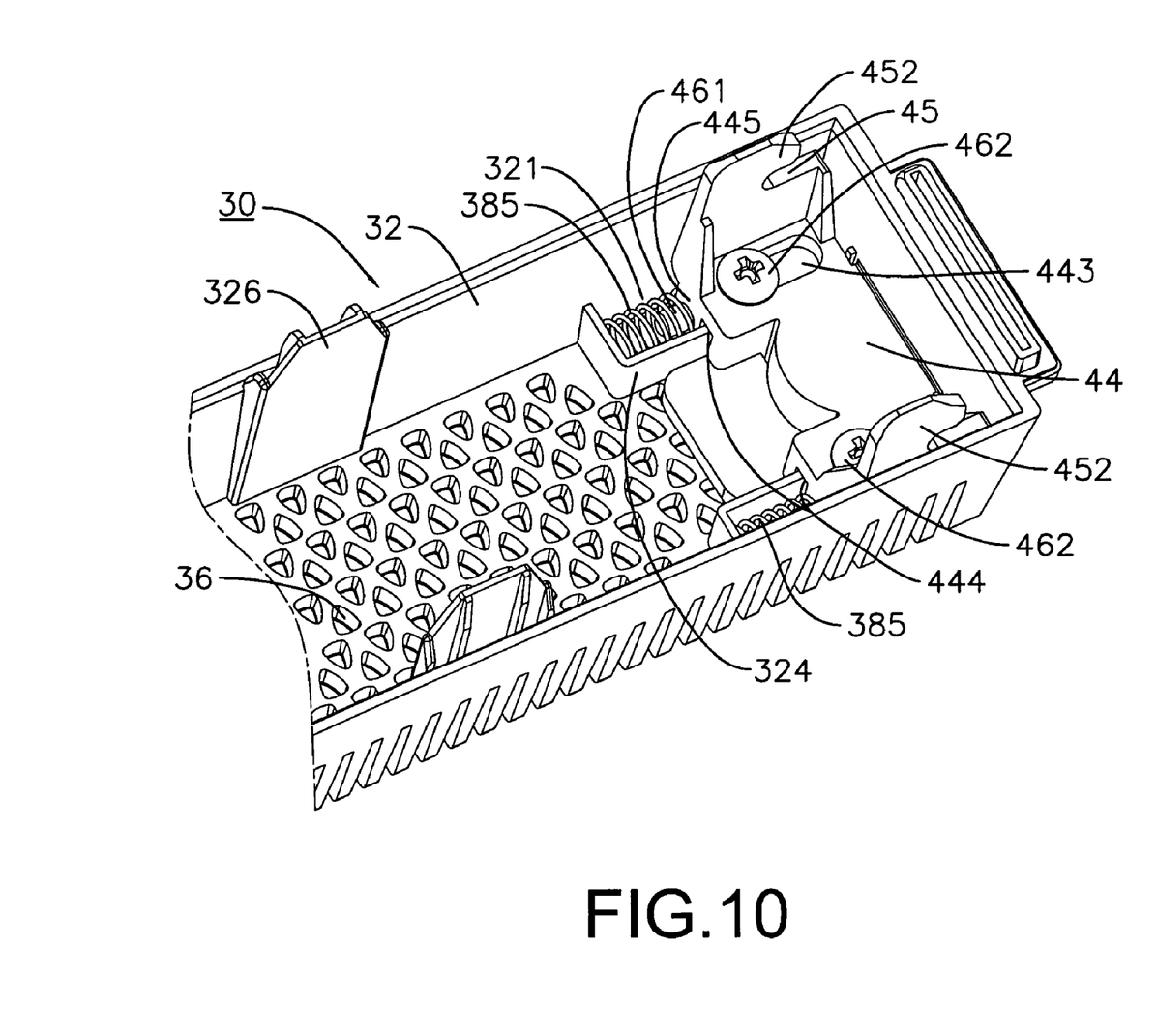
FIG. 10 shows a partial elevational view of the slide block connected to the host case according to the present invention.

Distance the slide blocks 40 can rectilinear displace along the hole length of the rectangular through holes 443 is controlled by left and right dead points thereof. For instance, referring to FIG. 7, when the fixed bolt 462 abuts against a right hole wall 4431, the slide block 40 is prevented from being displaced any further rightward, and when the fixed bolt 462 abuts against a left hole wall 4432, the slide block 40 is again prevented from being displaced any further leftward. Referring to FIG. 10, wherein narrow through grooves 444 with protruding walls 324 serve as tracks for linear slide movement thereon, and further control rectilinear displacement of the slide blocks 40 within depressed spaces 38.

Wherein a protruding post 461 located on a side wall 445 of each of the slide bocks 40 enable resilient members 385 to be respectively disposed thereon, thereby preventing malpositioning of the resilient members 385. Hook members 452 of the slide blocks 40 respectively hook onto hole wall surfaces 52 and slide within respective first position fixing holes 50.

An operator is able to remove the outer cover 30 from a rectangular gap 18 by disengaging resilient pieces 326 from second connecting holes 54, thereby effectuating disconnection of a jack panel 22 of a circuit motherboard 20 fixed to a bottom plate 12 from a socket 351, and disconnecting electrical connection thereat, which eliminates shortcomings of a "flexible flat cable" of prior art serving as an electrical connecting member whereby after the outer cover 30 is separated from the host case 10, electrical connection is completely disconnected, thereby realizing a rapid and convenient method of disassembly.

Method for assembling the outer cover 30 to the host case 10 is described hereinafter:

Referring to FIGS. 8 and 1, an operator holds the outer cover 30, and presses and displaces the displacement pieces 42 with his fingers, thereby causing the hook members 452, (452) to respectively position within the two first position fixing holes 50, (50), whereupon the resilient pieces 326 simultaneously resiliently deform and become inserted into and clasp within the second position fixing holes 54, (54), thereby preliminary embedding the outer cover 30 within the rectangular gap 18. The operator then releases finger pressure on the displacement pieces 42, whereupon the resilient members 385 reposition and assume an elastic extended state. The resilient members 385 push against the side walls 445 to cause linear displacement, as depicted in FIG. 7, at which time the slide blocks 40 simultaneously reposition. Furthermore, the slide grooves 45 are caused to slide connect to a limiting surface of each of the hole walls 52, thereby causing the hook members 452 to hook onto the hole walls 52, and further firmly clasp the outer cover 30 within the rectangular gap 18 of the host case 10 (see FIG. 9).

Which effectuates positioning and firm insertion of the jack panel 22 into the jack socket of the connection socket 351, thus forming an electrical connection, and signals processed by the circuit motherboard 20 are transmitted to the socket 351 through the jack panel 22 or signals from the socket 351 are transmitted to the jack panel 22. Hence, control signals from the circuit motherboard 20 are transmitted to the circuit daughter board 35 through the socket 351, thereby enabling the display unit 352 to display the control signals of the circuit motherboard 20 and reveal graphic patterns of character and numbers. The characters and numbers displayed by the display unit 352 can be visualized through the transparent window 34, thereby enabling a user to visualize operating status of the host computer.

The operator presses the press-buttons 37 to set a variety of operational data, and the jack panel 22 transmits operational data signals to the circuit motherboard 20 through the socket 351 for processing by the circuit motherboard 20. Because the present invention has eliminated electrical connection of a "flexible flat cable" of prior art, thus, no flexible flat cable is present apart from the connection between the jack panel 22 and the socket 351, which increases conductive reliability of the electrical connection. Referring to FIG. 3, which shows an exploded view of the circuit daughter board 35 joined to the fixing piece 31, whereafter the fixing piece 31 is fitted into the holding space 32, thereby enabling the circuit daughter board 35 and the fixing piece 31 to be equally concealed within the holding space 32. Ventilation holes 317 defined in the fixing piece 31 and ventilation holes 36 defined in the outer cover 30 further improve circulation and heat dissipation of hot air within the holding space 16.

In conclusion, characteristics of the present invention have clearly achieved the objectives as described in this specification. Moreover, originality and advancement of the present invention clearly comply with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. An assembly device for a computer case and outer cover of the present invention, comprising:
   a host case provided with a bottom plate and perpendicular left and right side walls, which enable an upper cover to embed join thereon, a holding space is formed between the bottom plate and an upper cover, and a rectangular gap is formed in an opening of the holding space;
   a circuit motherboard fixed within the holding space, a jack panel of relatively small area and size is located at a tail end of the circuit motherboard, and an electrical circuit is printed on an inverse side of the jack panel;
   a rectangular outer cover, interior of which is provided with a holding space that enables affixing the following component members therein:
   (a) a rectangular laminate fixing piece defined with a gap;
   (b) a circuit daughter board having a rectangular laminate form, a surface of which has a socket soldered thereon that provides for an electric plug to be inserted therein, a display unit is soldered to another surface of the circuit daughter board, and the circuit daughter board is fixedly connected to an inner surface of the fixing piece so that the socket is positioned within the gap;
   the outer cover can be assembled/disassembled to/from the rectangular gap of the host case, and the jack panel can be plugged into or withdrawn from the socket.

2. The assembly device for a computer case and outer cover according to claim 1, wherein a window structured with a transparent cover is formed on an outer surface of the outer cover, and the display unit is positioned to correspond to an inner surface of the window.

3. The assembly device for a computer case and outer cover according to claim 1, wherein a plurality of ventilation holes and press-buttons that can be pressed by a user are located on the outer surface of the outer cover.

4. The assembly device for a computer case and outer cover according to claim 1, wherein a depressed space is defined in two sides of the outer case:
   two slide blocks, an upper portion of each of which is provided with a displacement piece that a user can move with his hand, and a lower portion of the displacement piece is provided with a slide base, the displacement piece and the slide base are formed as an integrated body, a bottom portion of which is provided with a slide groove, and a hook member is formed on a lower portion of the slide groove rectangular recesses are respectively defined on two sides of the holding space of the outer cover, and one side of each of the recesses forms a protruding wall, a fixed inner bolt post is located within each of the recesses, and the inner bolt posts are respectively provided with bolt holes, rectangular holding spaces are defined in a side bottom portion of each of the slide bases, and narrow through grooves are respectively defined in adjacent walls of the rectangular holding spaces, a rectangular through hole is defined in one surface of each of the slide bases, and the protruding walls slide connect into the narrow through grooves, thereby enabling the protruding walls to serve as tracks, the inner bolt posts movably penetrate the holding spaces, and bolts respectively penetrate the rectangular through holes and bolt down into the inner bolt posts, a resilient member is respectively disposed within each of the recesses, and an end of each of the elastic members abuts against a wall surface of the respective recesses, while another end of each of the resilient members abuts against a side wall surface of the respective slide base;

the slide blocks are movably connected to the protruding walls and the inner bolt posts, thereby enabling linear displacement on the protruding walls;

first position fixing holes are respectively defined in two sides of outer ends of the upper cover and the bottom plate, the hook members penetrate and connect within the first position fixing holes by respectively hooking onto hole walls of the first position fixing holes.

5. The assembly device for a computer case and outer cover according to claim 1, wherein connecting holes are defined in the circuit daughter board, and bolt holes are defined in a surface of the fixing piece, bolts respectively penetrate the connecting holes and bolt within the bolt holes, thereby fixing the circuit daughter board to the fixing piece.

6. The assembly device for a computer case and outer cover according to claim 1, wherein connecting holes are defined in the surface of the fixing piece, and bolt holes are defined in the holding space of the outer cover, bolts respectively penetrate the connecting holes and bolt within the bolt holes, thereby fixedly positioning the fixing piece within the holding space.

7. The assembly device for a computer case and outer cover according to claim 1, wherein a plurality of second position fixing holes are respectively defined in the two sides of the outer ends of the upper cover and the bottom plate of the host case;

a plurality of resilient pieces respectively extend and protrude from upper and lower wall edges of the holding space of the outer cover, which are used to clasp within the second connecting holes.

* * * * *